United States Patent
Zhang

(10) Patent No.: US 12,508,791 B2
(45) Date of Patent: Dec. 30, 2025

(54) FIRE EXTINGUISHING AIR BUBBLE FILM FILLED WITH GASEOUS FIRE-EXTINGUISHING MEDIUM, AND MANUFACTURING METHOD THEREFOR

(71) Applicant: CIVIL AVIATION UNIVERSITY OF CHINA, Tianjin (CN)

(72) Inventor: Haijun Zhang, Tianjin (CN)

(73) Assignee: CIVIL AVIATION UNIVERSITY OF CHINA, Tianjin (CN)

( * ) Notice: Subject to any disclaimer, the term of this patent is extended or adjusted under 35 U.S.C. 154(b) by 408 days.

(21) Appl. No.: 17/906,776

(22) PCT Filed: Jun. 23, 2021

(86) PCT No.: PCT/CN2021/101771
§ 371 (c)(1),
(2) Date: Sep. 20, 2022

(87) PCT Pub. No.: WO2021/259312
PCT Pub. Date: Dec. 30, 2021

(65) Prior Publication Data
US 2023/0150224 A1 May 18, 2023

(30) Foreign Application Priority Data
Jun. 24, 2020 (CN) .......................... 202010589949.5

(51) Int. Cl.
*B32B 3/26* (2006.01)
*A62D 1/00* (2006.01)
(Continued)

(52) U.S. Cl.
CPC .............. *B32B 3/26* (2013.01); *A62D 1/0007* (2013.01); *B32B 27/08* (2013.01); *B32B 27/20* (2013.01);
(Continued)

(58) Field of Classification Search
CPC . A62C 99/0018; A62C 35/10; F42B 8/12–14; B32B 3/26; B32B 27/08;
(Continued)

(56) References Cited

U.S. PATENT DOCUMENTS

2006/0281868 A1\* 12/2006 Sudhin ................... C08L 23/16
525/240
2014/0120304 A1 5/2014 Ghali
(Continued)

FOREIGN PATENT DOCUMENTS

CN 109679263 A 4/2019
CN 210590807 U 5/2020
(Continued)

OTHER PUBLICATIONS

PCT International Search Report for International Application No. PCT/CN2021/101771, dated Sep. 26, 2021, 2 pages.

*Primary Examiner* — Tuongminh N Pham
(74) *Attorney, Agent, or Firm* — Hoffman Warnick LLC

(57) ABSTRACT

The present disclosure provides a fire extinguishing air bubble film filled with a gaseous fire-extinguishing medium, and a manufacturing method therefor. The fire extinguishing air bubble film includes a double-layer air bubble film base material and buffer air bubbles distributed in the double-layer air bubble film base material and internally filled with the gaseous fire-extinguishing medium, where the air bubble film base material is prepared from polyethylene as a base material and auxiliary materials in a specified weight ratio.

2 Claims, 1 Drawing Sheet

(51) Int. Cl.
  *B32B 27/08* (2006.01)
  *B32B 27/20* (2006.01)
  *B32B 27/22* (2006.01)
  *B32B 27/32* (2006.01)
  *B32B 37/10* (2006.01)
  *B32B 37/20* (2006.01)
  *B32B 38/00* (2006.01)
  *B32B 38/08* (2006.01)

(52) U.S. Cl.
  CPC .............. *B32B 27/22* (2013.01); *B32B 27/32* (2013.01); *B32B 37/10* (2013.01); *B32B 37/203* (2013.01); *B32B 38/0004* (2013.01); *B32B 38/08* (2013.01); *B32B 2250/02* (2013.01); *B32B 2250/242* (2013.01); *B32B 2307/3065* (2013.01); *B32B 2307/4026* (2013.01)

(58) Field of Classification Search
  CPC ......... B32B 27/20; B32B 27/22; B32B 27/32; B32B 37/10; B32B 37/203; B32B 38/0004; B32B 38/08; B32B 2250/02; B32B 2250/242; B32B 2307/3065; B32B 2307/4026; A62D 1/0007
  See application file for complete search history.

(56) References Cited

U.S. PATENT DOCUMENTS

| | | | |
|---|---|---|---|
| 2019/0046822 A1* | 2/2019 | Iwasaki | A62C 35/023 |
| 2020/0144561 A1* | 5/2020 | Shin | B32B 15/088 |
| 2023/0045673 A1* | 2/2023 | Michael-Sapia | C08J 9/34 |

FOREIGN PATENT DOCUMENTS

| | | |
|---|---|---|
| CN | 111660642 A | 9/2020 |
| CN | 111716854 A | 9/2020 |

* cited by examiner

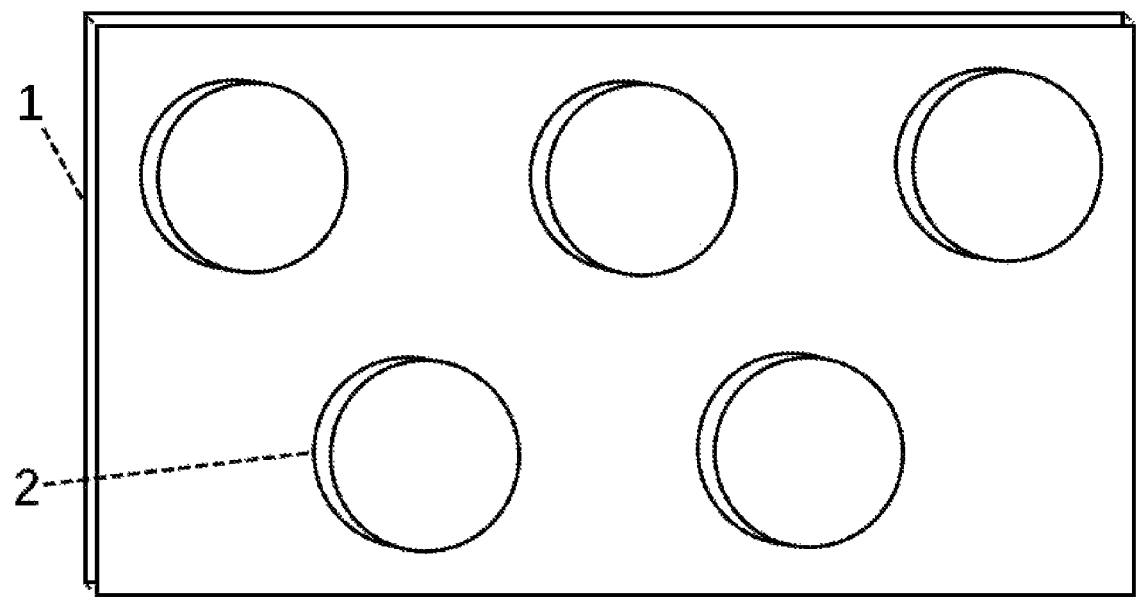

FIRE EXTINGUISHING AIR BUBBLE FILM FILLED WITH GASEOUS FIRE-EXTINGUISHING MEDIUM, AND MANUFACTURING METHOD THEREFOR

CROSS REFERENCE TO RELATED APPLICATION

This patent application claims the benefit and priority of Chinese Patent Application No. 202010589949.5, filed on Jun. 24, 2020, the disclosure of which is incorporated by reference herein in its entirety as part of the present application.

TECHNICAL FIELD

The present disclosure belongs to the technical field of air bubble films, and in particular relates to a fire extinguishing air bubble film filled with a gaseous fire-extinguishing medium, and a manufacturing method therefor.

BACKGROUND ART

At present, an air bubble film is made by subjecting polyethylene as a main raw material, and a whitening agent and an anti-block agent as auxiliary materials to extrusion and blistering into air bubbles at a high temperature of about 230° C. The air bubble film is a new type of plastic packaging material with a light texture, desirable transparency, no toxicity or odor, and provides moisture-proof, buffering, and heat preservation functions for products.

Nowadays, a large number of express packages are protected by wrapping with air bubble films. However, once the express packages encounter an open flame during transportation, the conventional air bubble films may facilitate combustion. Therefore, protected express items are easily burned, causing certain losses. Therefore, it is of great significance to further improve a protection effect of the express items and reduce a risk of fire disaster by development of an air bubble film with high temperature resistance, optimal fire extinguishing performance, and simple manufacturing process.

SUMMARY

In order to solve the above-mentioned problems, an objective of the present disclosure is to provide a fire extinguishing air bubble film filled with a gaseous fire-extinguishing medium, and a manufacturing method therefor.

In order to achieve the above objective, the present disclosure provides a fire extinguishing air bubble film filled with a gaseous fire-extinguishing medium, including a double-layer air bubble film base material and buffer air bubbles distributed in the double-layer air bubble film base material and internally filled with the gaseous fire-extinguishing medium, where the air bubble film base material is prepared from polyethylene as a base material and auxiliary materials in a specified weight ratio.

The auxiliary materials may include a resin, a biodegradable additive, a plasticizer, a flame retardant, an anti-block agent, and a whitening agent.

The polyethylene, the resin, the biodegradable additive, the plasticizer, the flame retardant, the anti-block agent, and the whitening agent may have a weight ratio of (5-65):(5-35):(1-20):(1-10):(0.1-5):(0.1-3):(0.1-2).

The polyethylene may be any one or a mixture of three selected from the group consisting of low-density polyethylene, linear low-density polyethylene, and high-density polyethylene, and the mixture of three can improve smoothness and transparency of a surface of the fire extinguishing air bubble film; the resin may be any one selected from the group consisting of a PVC-SC5 resin and a PVC-SG4 resin, with a degree of polymerization at 1,000 to 1,200, and the resin can appropriately increase a heat resistance, toughness and ductility of the fire extinguishing air bubble film; the biodegradable additive may be a BDP fully-biodegradable additive, which is an organic additive that does not affect a shelf life and strength of the fire extinguishing air bubble film; the plasticizer may be any one selected from the group consisting of dibutyl phthalate, dioctyl phthalate, tricresyl phosphate, and chlorinated paraffin; the flame retardant may be a DOPO flame retardant, with a structure including P—H bonds that are extremely active to olefins, epoxy bonds, and carbonyl groups and can react to generate many derivatives, and has a high chemical stability and desirable flame retardant properties; the anti-block agent may be a PE film anti-block agent, also known as a slipping agent or an anti-caking agent; and the whitening agent may be any one selected from the group consisting of a fluorescent whitening agent OB and a fluorescent whitening agent OB-1.

The gaseous fire-extinguishing medium may include any one or any mixture of two or more selected from the group consisting of chlorodifluoromethane (R22), trifluoromethane, trifluoromethyl iodide, pentafluoroethyl iodide, 2-bromo-3,3,3-trifluoropropene (2-BTP), hexafluoropropane (FE-36), heptafluoropropane (FM-200), perfluorohexanone, an INERGEN gas, and Halon, as well as an inert gas including carbon dioxide, nitrogen, neon, helium, argon, krypton, xenon, and radon.

The present disclosure further provides a manufacturing method for the fire extinguishing air bubble film filled with a gaseous fire-extinguishing medium, including the following steps:

1) weighing the polyethylene, the resin, the biodegradable additive, the plasticizer, the flame retardant, the anti-block agent, and the whitening agent according to a weight ratio of (5-65):(5-35):(1-20):(1-10):(0.1-5):(0.1-3):(0.1-2), and fully stirring in a mixer to prepare a granular air bubble film mixture;
2) melting the air bubble film mixture by heating at a high temperature in a heating device to prepare a pasty material;
3) sending the pasty material into a film blowing machine, and conducting extrusion, expansion, pulling, and air injection to obtain a cylindrical film;
4) cutting the cylindrical film into two sheet films, overlapping the two films and rolling-up on a reel of an extruder, passing the overlapped films through a pressure roller to prepare the double-layer air bubble film base material, and softening by heating;
5) slowly winding a softened double-layer air bubble film base material on a vacuum forming roller, such that the film close to round holes on the vacuum forming roller is sucked up to form small vacuum air bubbles;
6) filling a gaseous fire-extinguishing medium in each of the small vacuum air bubbles through air supply holes on the small vacuum air bubble by small filling holes in the round holes on the vacuum forming roller, such that the small vacuum air bubbles expand gradually to form full buffer air bubbles with a size of the round holes and attached to the vacuum forming roller; and conducting plastic package on positions of the air supply holes by heating, thereby preparing the double-layer air bubble film base material; and 7) subjecting the double-layer air bubble film base material to cooling, shaping, extension, flattening, dragging, spot-breaking, and rolling-up, to obtain the fire extinguishing air bubble film filled with a gaseous fire-extinguishing medium.

In step 1), the stirring in the mixer may be conducted at 300 r/min to 500 r/min for 20 min to 30 min to obtain the air bubble film mixture with a particle size of 0.2 mm to 0.3 mm.

In step 2), the heating in the heating device may be conducted at 230° C.

In step 4), the heating may be conducted at 140° C. to 180° C.

In step 6), the plastic package by heating may be conducted at 140° C. to 200° C.

Compared with the prior art, in the manufacturing method for the fire extinguishing air bubble film filled with a gaseous fire-extinguishing medium, the fire extinguishing air bubble film can be prepared by using various polyethylenes as a base material. By adding a certain proportion of a flame retardant during the mixing, and filling a large amount of the fire extinguishing gas in the air bubbles through a suitable method, the air bubble film has an improved high temperature resistance without changing original performances and an obvious fire extinguishing effect. In addition, the fire extinguishing air bubble film is not easily damaged due to a strong toughness, and has a simple processing process. Therefore, the product has market competitiveness and can bring better benefits.

BRIEF DESCRIPTION OF THE DRAWINGS

FIG. 1 shows a schematic structural diagram of a fire extinguishing air bubble film filled with a gaseous fire-extinguishing medium provided by the present disclosure.

DETAILED DESCRIPTION OF THE EMBODIMENTS

The technical solutions in the examples of the present disclosure are clearly and completely described below. Apparently, the described examples are merely some rather than all of the examples of the present disclosure.

Example 1 (Comparative Example)

In this example, a manufacturing method for an fire extinguishing air bubble film filled with oxygen gas included the following steps:

1) low-density polyethylene, a PVC-SC5 resin, a BDP fully-biodegradable additive, dibutyl phthalate (DBP), a DOPO flame retardant, a PE film anti-block agent, and a fluorescent whitening agent OB were weighed according to a weight ratio of 40:25:20:10:2:2:1, and stirred clockwise in a mixer at 300 r/min for 20 min to prepare a granular air bubble film mixture with a particle size of 0.2 mm to 0.3 mm;

2) the air bubble film mixture was melted by heating at 230° C. in a heating device to prepare a pasty material;

3) the pasty material was sent into a film blowing machine, and extrusion, expansion, pulling, and air injection were conducted to obtain a hollow cylindrical film, where air injection made a thickness of the film more uniform;

4) the cylindrical film was cut into two sheet films, the two films were overlapped and rolled-up on a reel of an extruder, the overlapped films were passed through a pressure roller to prepare the double-layer air bubble film base material, and softened by heating at 140° C.;

5) a softened double-layer air bubble film base material was slowly winded on a vacuum forming roller, such that the film close to round holes on the vacuum forming roller was sucked up to form small vacuum air bubbles;

6) oxygen gas was filled in each of the small vacuum air bubbles through air supply holes on the small vacuum air bubble by small filling holes in the round holes on the vacuum forming roller, such that the small vacuum air bubbles expanded gradually to form full buffer air bubbles with a size of the round holes and attached to the vacuum forming roller; and plastic package was conducted on positions of the air supply holes by heating at 140° C., thereby preparing the double-layer air bubble film base material; and 7) the double-layer air bubble film base material was subjected to cooling, shaping, extension, flattening, dragging, spot-breaking, and rolling-up, to obtain the fire extinguishing air bubble film filled with oxygen gas.

Example 2

In this example, a manufacturing method for an fire extinguishing air bubble film filled with Halon, R22, trifluoromethane, trifluoromethyl iodide, pentafluoroethyl iodide, and 2-BTP included the following steps:

1) linear low-density polyethylene, a PVC-SC5 resin, a BDP fully-biodegradable additive, dioctyl phthalate (DOP), a DOPO flame retardant, a PE film anti-block agent, and a fluorescent whitening agent OB were weighed according to a weight ratio of 45:24:16:8:3:2.5:1.5, and stirred clockwise in a mixer at 400 r/min for 20 min to prepare a granular air bubble film mixture with a particle size of 0.2 mm to 0.3 mm;

2) the air bubble film mixture was melted by heating at 230° C. in a heating device to prepare a pasty material;

3) the pasty material was sent into a film blowing machine, and extrusion, expansion, pulling, and air injection were conducted to obtain a hollow cylindrical film, where air injection made a thickness of the film more uniform;

4) the cylindrical film was cut into two sheet films, the two films were overlapped and rolled-up on a reel of an extruder, the overlapped films were passed through a pressure roller to prepare the double-layer air bubble film base material 1, and softened by heating at 140° C.;

5) a softened double-layer air bubble film base material 1 was slowly winded on a vacuum forming roller, such that the film close to round holes on the vacuum forming roller was sucked up to form small vacuum air bubbles;

6) Halon, R22, trifluoromethane, trifluoromethyl iodide, pentafluoroethyl iodide, and 2-BTP was filled in each of the small vacuum air bubbles through air supply holes on the small vacuum air bubble by small filling holes in the round holes on the vacuum forming roller, such that the small vacuum air bubbles expanded gradually to form full buffer air bubbles 2 with a size of the round holes and attached to the vacuum forming roller; and plastic package was conducted on positions of the air supply holes by heating at 160° C., thereby preparing the double-layer air bubble film base material; and 7) the double-layer air bubble film base material was subjected to cooling, shaping, extension, flattening, dragging, spot-breaking, and rolling-up, to obtain the fire extinguishing air bubble film filled with Halon, R22, trifluoromethane, trifluoromethyl iodide, pentafluoroethyl iodide, and 2-BTP, as shown in FIG. 1.

Example 3

In this example, a manufacturing method for an fire extinguishing air bubble film filled with a mixed gas of FE-36, FM-200, perfluorohexanone, an INERGEN gas, and carbon dioxide included the following steps:
1) high-density polyethylene, a PVC-SG4 resin, a BDP fully-biodegradable additive, tricresyl phosphate, a DOPO flame retardant, a PE film anti-block agent, and fluorescent whitening agent OB-1 were weighed according to a weight ratio of 50:15:19:6:5:3:2, and stirred clockwise in a mixer at 400 r/min for 25 min to prepare a granular air bubble film mixture with a particle size of 0.2 mm to 0.3 mm;
2) the air bubble film mixture was melted by heating at 230° C. in a heating device to prepare a pasty material;
3) the pasty material was sent into a film blowing machine, and extrusion, expansion, pulling, and air injection were conducted to obtain a hollow cylindrical film, where air injection made a thickness of the film more uniform;
4) the cylindrical film was cut into two sheet films, the two films were overlapped and rolled-up on a reel of an extruder, the overlapped films were passed through a pressure roller to prepare the double-layer air bubble film base material 1, and softened by heating at 160° C.;
5) a softened double-layer air bubble film base material 1 was slowly winded on a vacuum forming roller, such that the film close to round holes on the vacuum forming roller was sucked up to form small vacuum air bubbles;
6) a mixed gas of FE-36, FM-200, perfluorohexanone, an INERGEN gas, and carbon dioxide was filled in each of the small vacuum air bubbles through air supply holes on the small vacuum air bubble by small filling holes in the round holes on the vacuum forming roller, such that the small vacuum air bubbles expanded gradually to form full buffer air bubbles 2 with a size of the round holes and attached to the vacuum forming roller; and plastic package was conducted on positions of the air supply holes by heating at 180° C., thereby preparing the double-layer air bubble film base material; and
7) the double-layer air bubble film base material was subjected to cooling, shaping, extension, flattening, dragging, spot-breaking, and rolling-up, to obtain the fire extinguishing air bubble film filled with a mixed gas of FE-36, FM-200, perfluorohexanone, an INERGEN gas, and carbon dioxide.

Example 4

In this example, a manufacturing method for an fire extinguishing air bubble film filled with an inert gas including carbon dioxide, nitrogen, neon, helium, argon, krypton, xenon, and radon included the following steps:

1) low-density polyethylene, a mixture of linear low-density polyethylene and high-density polyethylene, a PVC-SG4 resin, a BDP fully-biodegradable additive, chlorinated paraffin, a DOPO flame retardant, a PE film anti-block agent, and a fluorescent whitening agent OB-1 were weighed according to a weight ratio of 55:22:15:4:1:2.5:0.5, and stirred clockwise in a mixer at 500 r/min for 30 min to prepare a granular air bubble film mixture with a particle size of 0.2 mm to 0.3 mm;
2) the air bubble film mixture was melted by heating at 230° C. in a heating device to prepare a pasty material;
3) the pasty material was sent into a film blowing machine, and extrusion, expansion, pulling, and air injection were conducted to obtain a hollow cylindrical film, where air injection made a thickness of the film more uniform;
4) the cylindrical film was cut into two sheet films, the two films were overlapped and rolled-up on a reel of an extruder, the overlapped films were passed through a pressure roller to prepare the double-layer air bubble film base material 1, and softened by heating at 180° C.;
5) a softened double-layer air bubble film base material 1 was slowly winded on a vacuum forming roller, such that the film close to round holes on the vacuum forming roller was sucked up to form small vacuum air bubbles;
6) an inert gas including carbon dioxide, nitrogen, neon, helium, argon, krypton, xenon, and radon was filled in each of the small vacuum air bubbles through air supply holes on the small vacuum air bubble by small filling holes in the round holes on the vacuum forming roller, such that the small vacuum air bubbles expanded gradually to form full buffer air bubbles 2 with a size of the round holes and attached to the vacuum forming roller; and plastic package was conducted on positions of the air supply holes by heating at 200° C., thereby preparing the double-layer air bubble film base material; and
7) the double-layer air bubble film base material was subjected to cooling, shaping, extension, flattening, dragging, spot-breaking, and rolling-up, to obtain the fire extinguishing air bubble film filled with an inert gas including carbon dioxide, nitrogen, neon, helium, argon, krypton, xenon, and radon.

In order to verify an effect of the present disclosure, ignition experiments were conducted on the air bubble films prepared in Examples 1 to 4. The test results showed that the oxygen gas-filled air bubble film prepared in Example 1 by filling with the oxygen gas in the air bubbles has a significantly earlier ignition time than that of the fire extinguishing air bubble film filled with a gaseous fire-extinguishing medium prepared in Examples 2 to 4. Moreover, due to an combustion-supporting effect of the oxygen gas, a flame intensity of the air bubble film filled with the oxygen gas in the air bubbles is obviously stronger than that of the fire extinguishing air bubble film filled with a gaseous fire-extinguishing medium at an initial stage.

The fire extinguishing air bubble films filled with a gaseous fire-extinguishing medium prepared in Examples 2 to 4 were compared in pairs. The test results showed that, compared with Example 3 having more flame retardant formulation, Example 2 had a slightly shorter ignition time, but a higher burning speed; compared with Example 4 having less flame retardant formulation, Example 2 had a slightly longer ignition time and a lower burning speed; compared with Example 4 with less flame retardant formulation, Example 3 had a significantly longer ignition time and a significantly lower burning speed.

The above descriptions are merely preferred embodiments of the present disclosure, rather than limit the present disclosure. Although the present invention is described in detail with reference to the foregoing embodiments, those skilled in the art can still make modifications to the technical solutions described in the foregoing embodiments, or make equivalent replacement to some of the technical features. Any modifications, equivalent substitutions, improvements, and the like made within the spirit and principle of the present disclosure should be included within the protection scope of the present disclosure.

What is claimed is:

1. A fire extinguishing air bubble film filled with a gaseous fire-extinguishing medium, comprising a double-layer air bubble film base material (1) and buffer air bubbles (2) distributed in the double-layer air bubble film base material (1) and internally filled with the gaseous fire-extinguishing medium, wherein the air bubble film base material (1) is prepared from polyethylene as a base material and auxiliary materials in a specified weight ratio;
    wherein the auxiliary materials comprise a resin, a biodegradable additive, a plasticizer, a flame retardant, an anti-block agent, and a whitening agent;
    wherein the polyethylene, the resin, the biodegradable additive, the plasticizer, the flame retardant, the anti-block agent, and the whitening agent have a weight ratio of (5-65):(5-35):(1-20):(1-10):(0.1-5):(0.1-3):(0.1-2); and
    wherein the polyethylene is any one or a mixture of three selected from the group consisting of low-density polyethylene, linear low-density polyethylene, and high-density polyethylene; the resin is any one selected from the group consisting of a PVC (polyvinyl chloride)-SC5 resin and a PVC (polyvinyl chloride)-SG4 resin, with a degree of polymerization at 1,000 to 1,200; the biodegradable additive is a BDP (biodegradable plastics) fully-biodegradable additive; the plasticizer is any one selected from the group consisting of dibutyl phthalate, dioctyl phthalate, tricresyl phosphate, and chlorinated paraffin; the flame retardant is a DOPO (9,10-dihydro-9-oxa-10-phosphaphenanthrene-10-oxide) flame retardant; the anti-block agent is a PE film anti-block agent; and the whitening agent is any one selected from the group consisting of a fluorescent whitening agent OB (2,5-bis(5-tert-butyl-2-benzoxazolyl)thiophene) and a fluorescent whitening agent OB-1 (styryl bisbenzoxazole).

2. The fire extinguishing air bubble film filled with the gaseous fire-extinguishing medium according to claim 1, wherein the gaseous fire-extinguishing medium comprises any one or any mixture of two or more selected from the group consisting of chlorodifluoromethane (R22), trifluoromethane, trifluoromethyl iodide, pentafluoroethyl iodide, 2-bromo-3,3,3-trifluoropropene (2-BTP), hexafluoropropane (FE-36), heptafluoropropane (FM-200), perfluorohexanone, an INERGEN gas, and Halon, as well as an inert gas comprising carbon dioxide, nitrogen, neon, helium, argon, krypton, xenon, and radon.

* * * * *